United States Patent [19]

Kaule

[11] Patent Number: 5,248,544
[45] Date of Patent: Sep. 28, 1993

[54] PAPER OF VALUE HAVING AN OPTICALLY VARIABLE SECURITY ELEMENT

[75] Inventor: Wittich Kaule, Emmering, Fed. Rep. of Germany

[73] Assignee: GAO Gesellschaft fur Automation und Organisation mbH, Fed. Rep. of Germany

[21] Appl. No.: 649,066

[22] Filed: Feb. 1, 1991

[30] Foreign Application Priority Data

Feb. 1, 1990 [DE] Fed. Rep. of Germany ....... 4002979

[51] Int. Cl.$^5$ .............................................. B32B 9/00
[52] U.S. Cl. ................................... 428/195; 428/916; 428/915; 283/86; 283/94
[58] Field of Search ................ 283/86, 94; 428/916, 428/915, 195

[56] References Cited

U.S. PATENT DOCUMENTS 4,971,646  11/1990  Schell et al. ..................... 283/86

FOREIGN PATENT DOCUMENTS

| 0024053 | 2/1981 | European Pat. Off. . |
| 0251253 | 1/1988 | European Pat. Off. .............. 283/94 |
| 0330738 | 9/1989 | European Pat. Off. . |
| 0371470 | 6/1990 | European Pat. Off. . |
| 2331455 | 6/1977 | France . |
| 2181993 | 7/1987 | United Kingdom . |
| 2209995 | 6/1989 | United Kingdom ................. 283/86 |

Primary Examiner—Patrick J. Ryan
Assistant Examiner—Cathy Lee
Attorney, Agent, or Firm—Bacon & Thomas

[57] ABSTRACT

A data carrier (1) such as a paper of value or the like having an optically variable element (5, 6), in particular a hologram, applied to the surface, and an additional printed pattern (2), applied in particular by steel intaglio printing, wherein the surface of the data carrier (15, 16, 20, 21) is smoother in the area of the optically variable element than in the remaining surface.

12 Claims, 2 Drawing Sheets

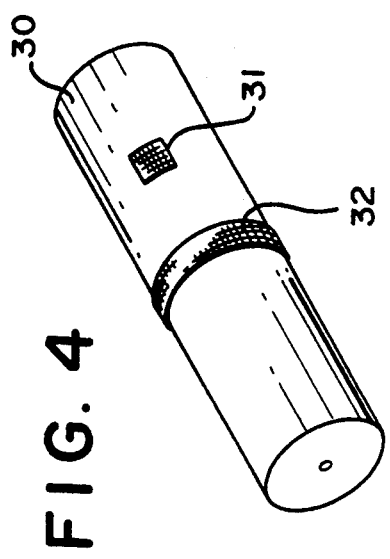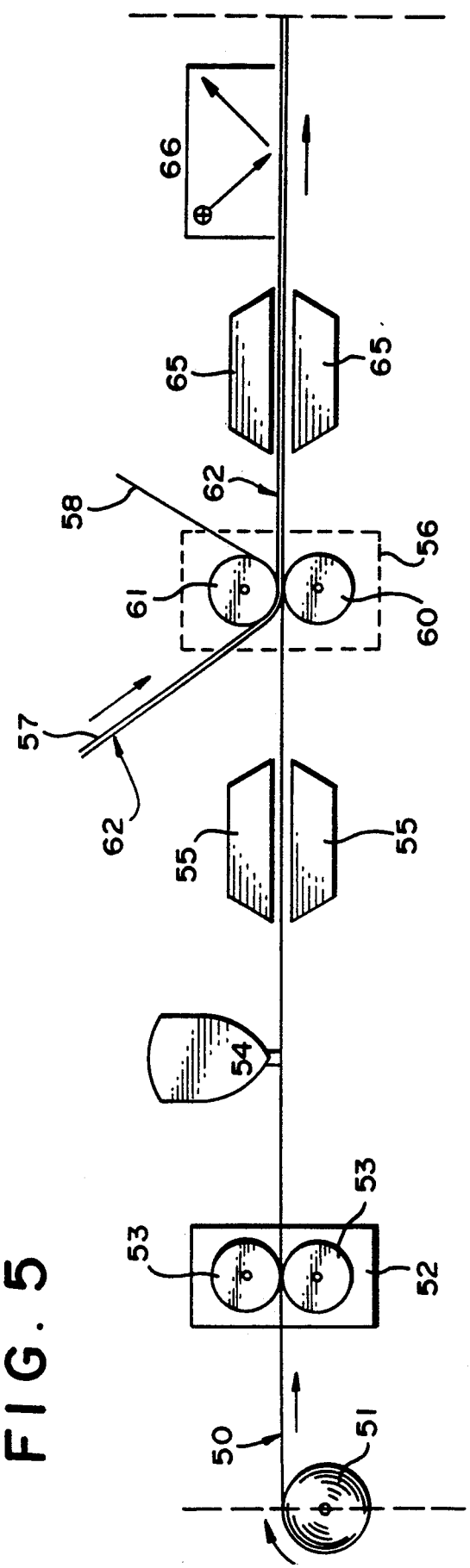

PAPER OF VALUE HAVING AN OPTICALLY VARIABLE SECURITY ELEMENT

FIELD OF THE INVENTION

The present invention relates to a data carrier made of paper, in particular a paper of value, a bank note or the like, having applied to its surface an optically variable security element such as a diffraction grid, hologram, interference element, liquid crystal polymer or the like, with an additional printed pattern applied by a printing method, in particular by steel intaglio printing, and a method and apparatus for producing it.

DESCRIPTION OF PRIOR ART

To be protected against imitation by means of color copiers, papers of value are increasingly equipped with optically variable security elements, in particular holograms. This protection against forgery is based on the copier's insufficient ability to reproduce the optical properties of the elements.

Various methods are known for applying optically variable elements (OVD), in particular holograms, to data carriers. They can be divided into the three categories of gluing, transfer printing and embossing.

By the gluing method, adhesive labels that are initially prepunched on silicone paper are automatically transferred to the paper substrate. The adhesive labels have a layer structure composed of a pressure-sensitive adhesive layer, a self-supporting film with an optically active layer above a diffraction grid, for example, and a protective layer located thereabove. The thickness of an adhesive label is typically in the range of 50 micrometers, the main part of the thickness being due to the film material.

In transfer printing, also known as "hot stamping," the optically variable element is prefabricated on a transfer band and transferred to the substrate in a subsequent working step. The structure transferred to the paper typically has a thickness in the range of a few micrometers. In the case of holograms the customary layer structure of the element comprises a heat-sealing layer, a layer of lacquer with an embossing, an aluminized layer and a transparent covering protective layer. This layer structure is initially located on the transfer foil, being "affixed" to the foil by a release layer (e.g. a wax layer). One transfers the band by placing it with the heat-sealing layer on the substrate and activating the heat-sealing layer by pressing on a heated die, so that the element bonds with the substrate. Simultaneously, the separation layer melts, thereby detaching the hologram from the transfer band. The transfer principle is the most frequently applied method today and is used in particular for applying holograms to plastic credit cards.

The embossing method is mainly suitable for diffraction elements, such as holograms and optical grids. A layer of hardenable lacquer is applied to a substrate that is preferably provided with an extremely thin and reflective metal surface. A press die is then used to emboss the diffraction relief structure into the layer of lacquer. After the lacquer has hardened the structure is covered with a protective lacquer. The finished element has a layer structure comprising the successive layers of lacquer with the metal layer and relief structure and the layer of protective lacquer.

Each of the methods and resulting products has its own special advantages and disadvantages. For example, adhesive labels are technically easy to produce and can be transferred to the intended substrates without any trouble. An extreme disadvantage of adhesive labels for application in the paper-of-value branch, however, is that the entire elements can be detached from the substrate and transferred to forged products. For this reason, transfer and embossed elements are preferred for paper-of-value applications.

Transfer and embossed elements largely meet the requirements in terms of protection from forgery in the paper-of-value branch, but these elements involve a number of production engineering problems in connection with papers of value. The following two marginal conditions must be especially heeded.

Firstly, it must be taken into consideration that papers of value customarily have a high-security printed pattern; these patterns are applied in most cases by steel intaglio printing. Steel intaglio printing and related methods require a relatively high surface roughness of the substrate for the inks to bond well with the substrate. On the other hand, rough surfaces are unsuitable for the application of optical elements.

Secondly, it must be heeded that the paper of value is subjected to a very high pressure load on its whole surface during steel intaglio printing. This customarily reduces the optical effect of any optical elements applied prior to printing; the elements can even be damaged or fully destroyed by the paper roughness pressed through from the paper base.

When producing papers of value equipped with optically variable elements one therefore first provided the paper of value with the printed pattern and then applied the OVD in one of the following method steps, or one divided the application of OVDs into single steps, performing the measures not endangered by steel intaglio printing before the printing and the others only after it. One thereby accepted the disadvantages that this direct coupling with the printing process made it impossible to prefabricate unprinted OVD papers of value in a job-neutral way (stockpile production), on the one hand, and that the application of the OVDs requires suitable machines (transfer machines, etc.) per printing line, on the other hand. The "OVD machines" required per printing line not only increase the cost and the space requirements of the machinery, but also cause a bottleneck at the end of each printing line due to their different production capacity, which must be compensated by increased efforts.

EP-A 338 378 discloses such a system for producing paper products that have both a printed pattern and an optical diffraction element. In a continuous process the paper is first printed in known printing units. Then, as in the described embossing method, a radiation hardenable lacquer is applied and provided with a diffraction structure in one operation. In subsequent operations the diffraction structure is vacuum coated with a reflective metal layer and provided with a protective lacquer.

In other known systems the operation of applying the hologram is divided in two. Following papermaking, the lacquer is applied to the paper surface in a first step. After the paper is printed the optical grid is embossed in the next step.

U.S. Pat. No. 4,420,515 describes a variant of this bipartite method. A metal layer with an adhesive layer thereabove is first applied to a plastic transfer band having a prepared surface. These two layers form the substructure of the future security element. In the first step the two layers are laminated onto the substrate, whereby the substructure of the element takes on the surface quality of the transfer band under the action of heat and pressure in the laminating operation. In the second step a printed pattern and an optically acting relief structure are applied to the substrate.

The forced order of printing and applying the optically effective layers or optically effective structures leads, as already mentioned, to a number of serious disadvantages.

One disadvantage of the known methods involves the greatly differing manufacturing speeds of printing machines and the apparatus for applying the optical elements. Comparing machines of the same type, for example sheet printing machines and sheet hologram machines, one ascertains that hologram machines have a processing speed that is lower by a factor of four. The lower working speed of hologram machines is due to necessary process engineering aspects. For example, the embossing of micrometer-fine structures is a method step that must be performed very carefully and is thus time-consuming. In a manufacturing chain of printing machines and hologram machines the hologram application thus constitutes a bottleneck that limits the manufacturing speed.

The forced order of production is particularly disadvantageous when it comes to the manufacture of papers of value. For reasons of process engineering, steel intaglio printing machines are almost always sheet machines, so that the following hologram application must also take place on sheet machines. It is well-known that sheet machines fundamentally have a low processing speed due to the handling of the sheet material; this property also applies to hologram machines. Since one cannot resort to the clearly faster reel machines for the hologram production as the sheets are already cut, the result is that, of all possible designs of a manufacturing chain for papers of value, the known methods only permit the variants having the lowest possible processing speed.

A further disadvantage of the known methods is the difficulty of integrating them into the organizational sequence of security printing plants. For security reasons it is virtually indispensable in paper-of-value manufacture for the printing process, in particular the printing of the serial number, to be the last processing operation before delivery of the papers of value. In security printing plants it is therefore an established custom to prefabricate paper with the corresponding security features, such as watermarks, safeguarding threads and any optical elements, and then to print it. This manufacturing sequence is likewise not possible with the known methods.

A further disadvantage of the known methods is the use of technologies that are unusual in the fields of papermaking and printing. For example, the vacuum metalizing of the embossed elements (see EP-A 338 378) or of a prepared transfer band (see U.S. Pat. No. 4,420,515) is a foreign technique that can currently not be integrated into papermaking and printing plants. Reasons for this are the above-mentioned different processing speeds of the different machines, the as yet high susceptance to trouble of the foreign techniques, the necessity of specialists, etc., so that all in all a smooth operation of a manufacturing chain is not ensured.

Assuming this prior art and its disadvantages, one is faced with the problem of finding a form of paper of value and a method of producing it that make it possible to arrange the manufacturing steps necessary for the printed pattern and the optical element in a variable order, to select and combine the different manufacturing machines in terms of their manufacturing capacity and processing speed, and to produce in the usual environment without using foreign techniques and without disturbing the organizational sequence in papermaking and printing plants, in particular in security printing plants.

BRIEF SUMMARY OF THE INVENTION

The invention is based on the hitherto neglected finding that optically variable elements and paper are two materials with extremely different properties, and that extremely different demands are also made on the two materials in accordance with the intended function. Paper, in particular paper of value, should have, among other properties, a certain "touch"; it must also be able to take and bind inks well. These properties are obtained by selecting special types of paper, preferably rag paper, and by setting a predetermined surface roughness and structure. Optically variable elements, by contrast, should have optical properties that are as effective as possible. For this purpose the laws of physics primarily demand surface profiles characterized by very high smoothness and flatness.

When applying the optical elements to paper one must therefore strike a balance between the different surface profiles or qualities. According to the current prior art this balance has been obtained up to now solely by adapting the structure and/or the application method of the optical elements to the roughness of the substrate. The focus on the optical elements to obtain this balance has also been greatly promoted by the fact that the paper properties are fixed within narrow tolerances in particular in the paper-of-value field, so that they have been regarded as a fixed variable in the overall manufacturing process.

In contrast to the previous procedure, the essence of the invention is to adapt the paper, in a first step, to the smoothness required for the optically variable elements by local glazing in the surface area intended for the optical element, using methods that are commonplace in papermaking and printing plants. The glazing is performed substantially only in the surface area covered by the intended element. The remaining area is left unchanged as far as possible during glazing, so that the surface quality required for the printing methods is retained there. The optical element is applied to the glazed area in a subsequent working step, preferably even before printing.

Using this surprisingly simple measure one can create locally limited marginal conditions on a data carrier that are optimally adapted to the particular purpose and also ensure the fulfillment of very different requirements.

For glazing and strengthening the paper surface various methods are known from printing and paper technology, that can be essentially divided into the categories of calendering and coating. These methods can also be used in a modified form for locally glazing the surface.

Calendering is performed by inserting the paper in reel or sheet form into a calender consisting, for example, of two opposing cylinders. To permit locally limited glazing, one or both cylinders of the calender have a raised design in the area where the element is to be applied, so that the paper is compressed and glazed above all in this area. A pressure is exerted in the range of 100 to 1,000 kp/cm tangent length. In accordance with the requirements the hologram areas have a raised design either on only one cylinder or on both cylinders.

Coating and related methods such as casting, cast coating, etc., are performed by applying a coat or a cast to the paper surface. To obtain a locally limited coat one requires coating systems adapted to the invention. For a coating in stripes it is expedient to use nozzle coating systems with laterally limited slot nozzles, for example, while for spots of any desired shape it is preferable to use gravure roller or cylinder mold units. Coating and casting slips are made substantially of mineral pigments and binders that hold together the pigments and anchor them in the body paper. The particle size is typically in the micrometer range, which is why coated or cast coated papers have a glazed surface.

The paper surface can also be coated with a leveling mass consisting at least partly of plastics materials. This can also be done using nozzle coating units, gravure roller units or cylinder mold units.

Glazing units can be either reel or sheet machines. Continuously glazing reel machines can be used to produce on paper webs one or more stripe-shaped zones having a glazed surface over the entire web length. These stripe-shaped zones are suitable in particular for the later application of endless elements in the form of bands or threads. It is particularly advantageous to apply the endless elements with reel machines as well.

To produce paper smooth enough for the application of holograms, very high pressure is necessary. Depending on the type of paper or form of the glazed area, it may happen that the paper undulates and is no longer suitable for printing. In this case one uses a glazing unit in which the areas where the holograms are to be applied are raised above the remaining area by only a few hundredths of a millimeter (preferably 5 to 50 micrometers). This means that the paper is greatly glazed at high pressure in the hologram area while it is only compressed in the remaining area to such an extent that no waves and distortions occur and the roughness required for steel engraving is retained.

The glazing unit can be located, as a module, at virtually any desired place before the hologram application within a manufacturing chain. The smallest machine unit comprises only an unrolling means for the paper web, a glazing unit and a rolling-up means. This unit can be extended by suitable apparatus for printing the paper and applying holograms. In particular the following units can be added between the glazing unit and the rolling-up means:

1. means for applying a filler, a bonding agent or an adhesive in the hologram area,
2. means for drying the bonding agent or the adhesive with the aid of heat, IR or UV radiation or electron beams,
3. means for applying the optically variable elements; one can alternatively use:
   transfer means for applying hot embossed holograms or other hot embossed elements,
   means for applying reflective surfaces for subsequent hologram embossings,
   means for applying lacquers and similar coatings and for embossing optical diffraction structures,
4. means for hardening the embossed lacquers, coatings or adhesives with the aid of heat or radiation,
5. means for applying protective layers with the aid of printing, coating or laminating methods,
6. means for inspecting the quality of the optically variable elements,
7. means for marking or individualizing the webs, copies from one sheet or elements,
8. printing units for further printing operations.

This list is neither complete nor does it prescribe the order of the machines; it merely represents one of many possible alternatives. The types of machines and their order in the manufacturing chain can be preselected or varied by the expert with reference to the list depending on the desired production sequence and type of element. It is also possible to add, at suitable places, rolling-up means for intermediate storage or other known machine elements such as reel cutters, sheet cutters or sorting means.

Despite these astonishingly simple inventive measures, the inventive data carriers and the possibilities of producing them offer numerous advantages.

A first advantage is the increase in the quality of the papers of value equipped with optical elements. While the layer structure of the elements formerly had to be adapted to the paper properties—one need merely recall the thick adhesive layers for compensating the surface roughness—the elements can now be optimized in terms of their proper function thanks to the invention. The use of thin adhesive layers already leads to a number of improvements. For example, an adhesive layer as thin as film ensures a high elasticity of the element, so that it can better survive the loads that occur particularly in the circulation of papers of value. A thin adhesive layer also increases the protection from forgery, since it makes it more difficult or impossible to split off the element along the adhesive layer.

A further increase in quality results from the possiblity of passing from embossed holograms to transfer elements. Transfer elements are preferably as security elements to embossed elements due to their simpler application method and their higher optical efficiency. However, since transfer elements typically have a thickness only in the range of a few micrometers they were hardly applied to paper surfaces up to now. The inventive manner of glazing now creates the conditions on the paper surface for applying such transfer elements.

Further advantages result from the possibility of integrating the hologram application at particularly suitable places in the production sequence on the basis of the invention. The resulting increase in manufacturing throughput, or increase in manufacturing capacity, is best apparent in paper-of-value manufacture. The working steps of glazing and hologram application can now be already performed in the reel stage of the paper as they are independent of the printing process. The high processing speed of the reel machines makes it possible to avoid the manufacturing bottlenecks that occur when sheet machines are used.

The independence of the printing process and the hologram application results in the further advantage that the procedural sequence customary in security printing plants can be maintained. Thus, the paper can be prefabricated with all its security elements, such as watermarks, safeguarding threads, optically variable elements, etc., and also be stored if necessary. The printing process, that is particularly critical in terms of security, is as usual the last method step. Due to the local surface glazing, no surface roughness is pressed through during the printing process any more. The printing of paper of value with elements already applied thereto thus leads to no impairment of its quality. This is true in particular if the surface roughness is not only eliminated during surface glazing but the paper is also provided with a local depression in which the element is embedded.

BRIEF DESCRIPTION OF THE DRAWINGS

Further advantages and features of the invention can be seen in the figures and the subsequent exemplary embodiments.

FIG. 4 shows a calendering roller for locally glazing paper, FIG. 5 shows a system for glazing paper and applying holograms.

DETAILED DESCRIPTION

Figure 1:
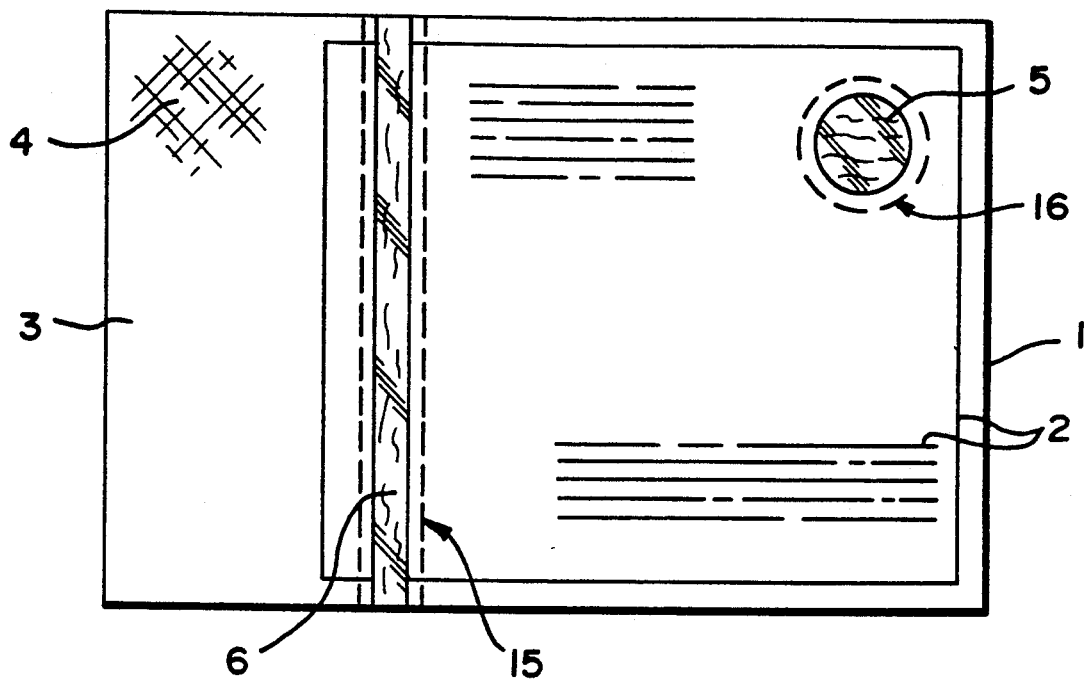
FIG. 1 shows a paper of value in a front view with pretreated surface areas.

FIG. 1 shows a data carrier in the form of a bank note 1. It has a printed area 2 and a white edge area 3 in which a watermark 4 is located. As protection from copying, two optically variable elements 5 and 6 are applied to the surface. As optically active layers, these elements can contain holographic relief structures, diffraction structures, interference layers, liquid crystal polymers and other optically acting surfaces. In preferred embodiments, element 5 is a reflection hologram with a circular base, for example. Element 6 is applied to the surface in the form of a band and extends over the entire wide of the bank note. As an optically active layer, this element preferably contains a repeating continuous diffraction grid.

The note has inventively glazed areas 15 and 16. In the Figure the limits of the areas are suggested by interrupted lines. Optically variable elements 5 and 6 are applied within glazed surface areas 15 and 16. The size of the areas is preferably selected in such a way that the elements can be placed reliably within these areas on the basis of the process tolerances, but it is also possible to give the areas any desired contour shape and size in accordance with the desired design. The glazed areas can be produced by local calendering or coating.

Figure 2:
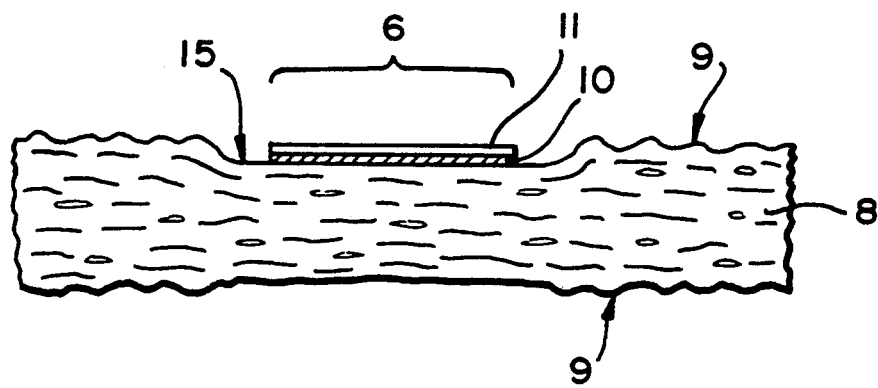
FIG. 2 shows a section through a paper of value with a calendered surface area.

FIG. 2 shows an enlarged section through bank note 1 in the area of element 6. By local calendering a smooth surface has been produced in surface area 15, and also in area 16 (not shown). Outside these areas 15 and 16 the bank note has its original surface roughness 9. The high surface quality in the glazed areas increases the range of variation for applying and designing optically variable elements 5 and 6.

In a first variant, element 6 can be applied by the embossing method. In the glazed surface area an adhesive layer 10 is first applied. Due to the surface quality, the layer thickness can now be optimized with respect to flexibility, protection from forgery and the effect of the element for the serviceability of the note. In the next method step a diffraction grid is then embossed in adhesive layer 10. In final working steps the embossed surface is provided with a thin metallic reflecting layer and coated with a protective lacquer 11. The embossed grid structures and the metal layer are not shown in FIG. 2 due to their microscopic size.

In a second variant, element 6 is applied by the transfer method. The element is present here in a prefabricated form on a transfer band or element. The prefabrication on the band makes it possible to integrate any desired optically effective layers in the layer structure; special reference is made here to reflective metal layers, interference layers, diffraction grids and holograms. The glazing of paper substrate 8 in surface area 15 of the application makes it possible to transfer elements to paper in good quality despite their small thickness and their low inner strength. After transfer the layer structure is similar to that produced by the embossing method. It comprises an adhesive layer 10, optically acting layers thereabove and one or more layers of lacquer 11.

During calendering a high pressure is exerted on the paper in the areas to be glazed, thereby pressing the paper fibers together irreversibly and reducing the surface roughness. Along with the glazing effects, calendering also causes a compression of paper substrate 8, which makes a depression form in the paper. This depression has the advantage that an optical element located therein is protected from contact and damage in any subsequent processing steps, for example during printing of the paper.

Figure 3:
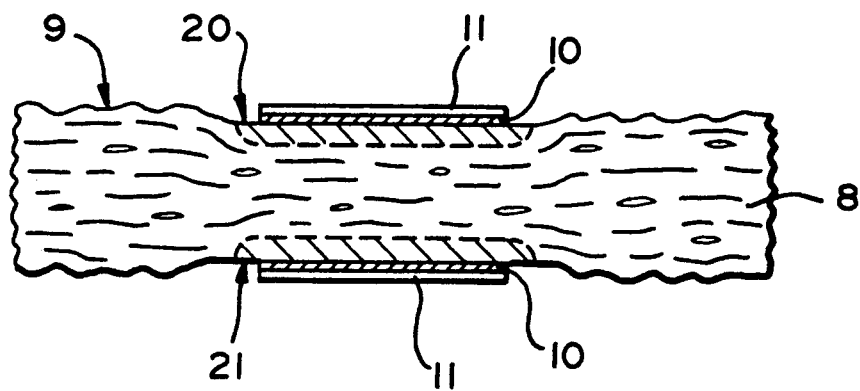
FIG. 3 shows a section through a paper of value with two opposing coated and rolled areas.

FIG. 3 also shows an enlarged section through bank note 14, whereby in this example the surface was glazed on the front and back by double-sided coating. For this purpose a coating slip is applied to the paper substrate in surface areas 20 and 21. For a more modest surface quality it is sufficient to dry the paper and the coating slip in known machines. A particularly level paper surface was obtained in the shown example by additionally drawing the coated paper through a glazing unit with high-polished machine glazing cylinders, thereby pressing the coating slip into the paper. The result is a bank note paper with two opposing glazed surface areas that show little or no projection from the paper surface. The coating slip used can be a coating substance known from papermaking. Both embossed and transfer elements can be applied to the glazed areas in ways already described.

FIG. 4 shows a calendering cylinder 30 as can be used in a glazing unit for locally glazing paper. In cylinder glazing units the paper runs between two culinders pressed together. For local glazing one or both cylinders of such a glazing unit are replaced by calendering cylinder 30 shown in FIG. 4. This cylinder has raised surfaces 31 and 32 in the hologram areas. The step height between the raised and recessed areas is preferably in the range of one millimeter and less. Surface 31 extends only over a small part of the peripheral surface and is suitable for producing isolated glazed areas in which element 5, for example, can be used. Surface 32 extends over the total periphery and produces on the paper web endless stripe-shaped zones that are particularly suitable for applying endless elements 6.

To produce paper smooth enough for the application of holograms, very high pressure is necessary. If this pressure is only applied to partial areas of the paper substrate, the paper can undulate depending on its properties and the contour shape of the areas to be glazed. It is then no longer suitable for printing and for later use. In such cases the glazing unit is preferably designed in such a way that the raised areas on the calendering cylinder stand out from the remaining areas by only fractions of a millimeter, preferably 5 to 50 micrometers. The distance between the two calendering cylinder is adjusted in such a way that the paper is greatly glazed at high pressure in the hologram area, while it is compressed in the remaining area only to such an extent that no waves and distortions occur. One thus avoids the washboard marks, simultaneously obtaining the roughness necessary for steel engraving. The pressure for glazing the paper is typically in the range of 100 to 1,000 kp per cm tangent.

Another way of glazing paper is coating. Since the customary roller coating units work over the entire paper width, one must either modify these machines for locally applying coating or casting slips, or use other types of machines that are adapted to the invention. Such types of machines are, for example, nozzle coating systems with laterally limited slot nozzles for applying the coating slip in stripes, or gravure roller units or cylinder mold units for coating in spots. To make surfaces with all kinds of outlines register with specifically placed watermarks for application of the elements, one can use an insetting unit customary in printing technology.

Procedures known from coating technology can also be transferred on local coating of the paper surface. For example, one can perform multi-step coating with precoating and final coating, or calender coating with the aid of coating calenders. It is particularly advantageous to use a method derived from cast coating, whereby a coating slip is first applied locally to the paper surface and the coating is then dried and provided with a dead-smooth surface in a glazing unit with a heated high-polished calendering cylinder.

Another manner of coating is to apply a mixture, not of mineral substances, but at least partly of plastics material. With small modifications, the same application methods and machines can be employed as stated above.

FIG. 5 shows an example of a manufacturing chain for producing an inventive paper of value 1. The manufacturing chain contains units for preparing the paper surface, for applying transfer holograms and for checking them. All machines are designed as reel machines and can be located anywhere between the papermaking and the printing. This marginal condition is suggested in FIG. 5 by the broken separating lines at the beginning and end of the manufacturing chain. In a preferred embodiment, the manufacturing chain is added in the papermaking before the so-called guillotine. That is, paper reel 51 comes from the web cutter of the paper machine, which cuts the wide web coming from the paper machine into narrower single webs; unit 66 is followed by the guillotine that divides the paper web into single sheets.

Paper-of-value web 50 is supplied continuously by the units. The paper can be removed from a supply reel 51 or else supplied directly by papermaking machines. The paper first runs into a glazing unit 52 that comprises two opposing calendering cylinders 53. The cylinders have raised areas 32 extending, as shown in FIG. 4, over the total periphery of the cylinders. In accordance with the existing number of copies from one sheet, the raised areas are repeated over the width of the cylinder. After local glazing the paper is supplied to an application unit 54 that applies a bonding agent to the glazed stripe or stripes. Next, the paper web runs into a drying means 55 where the bonding agent is dried by means of heat. Instead of drying by heat one can also use other methods, for example IR, UV or electron beam driers. In subsequent transfer unit 56 an endless hologram is applied to the glazed stripe or stripes. Transfer band 57 with the prefabricated holograms is removed from a supply reel (not shown) and brought together with the paper web. Positioning means (also not shown) ensure that the transfer band comes to lie in exact register with the glazed stripes. Rollers 60 and 61 of the transfer unit are heated and press the transfer band and paper web together. Under the action of pressure and heat, holographic layer structure 62 is detached from the transfer band and connects with paper web 50. Empty transfer band 58 is then removed from the paper web and disposed of on a winding-up means (not shown). Paper web 50 provided with the endless hologram then runs toward a second drying means 65 in which the transfer adhesive is hardened. Depending on the adhesive used, one can also use various drying methods here. Next, the paper web runs toward unit 64 in which a quality inspection of the endless hologram is conducted. The diffraction efficiency and the position of the hologram on the paper can be checked here, for example by a scanning light beam.

The quality-inspected paper web is now ready for printing. It can now either be wound onto winding-up means 65 and stored, as shown, or directly introduced into a printing machine familiar to the expert.

The manufacturing chain shown is of course not the only realizable solution for producing the inventive papers of value. For example, this manufacturing chain can include, instead of a transfer unit for applying transfer holograms, embossing units for producing embossed holograms or machines for applying other types of elements. It is also possible to supply the paper web, not to a winding-up means, but to other machines, such as printing units for printing operations or sheet cutters and sheet sorting means, etc.

The described manufacturing chain comprises the primary method steps of papermaking, application of elements and printing. As already mentioned, this order permitted only by the invention can be integrated into the production of papers of value with particularly great advantages in terms of manufacturing speed, production sequence, etc. For example, all steps necessary for applying the elements can be performed in the paper factory. The paper can then be processed further, like any other paper of value.

According to the described variant of the invention, no additional machines need thus be installed in the printing plant that might conflict with the available space there or impair the production throughput. It is also unnecessary to perform the application of the elements in the paper factory, since the measures shown in FIG. 5 and explained in detail in the description can of course also be provided in a separate third manufacturing plant. However, they may also be integrated directly, as described, as final or preceding units into the operational sequences of the paper factory or printing plant. Along with the functional advantages, the invention thus also offers an enormous flexibility in terms of process engineering.

I claim:

1. A paper member having a first surface area having a general surface roughness that produces distortion of a film optical element bonded thereon, and a second surface area contiguous with the first surface area and having a surface profile that will not distort a film optical element bonded thereon; and a film optical element bonded to at least a portion of said second surface area.

2. A paper member having a first surface area having a general surface roughness that produces distortion of an embossed optical element bonded thereon, and a second surface area contiguous with said first surface area and having a surface profile that will not distort an embossed optical element bonded thereon; an adhesive layer on at least a portion of the second surface area; and an embossed optical element applied to the adhesive layer.

3. A paper member as claimed in claim 1 or 2, wherein said first surface area general surface roughness is suitable for steel intaglio printing, and said surface profile of said second surface area is unsuitable for steel intaglio printing.

4. A paper member as claimed in claim 3, including steel intaglio printing on said first surface area.

5. A paper member as claimed in claim 1, wherein the film optical element is one selected from the group consisting of a hologram, diffraction grid, and interference element.

6. A paper member as claimed in claim 1, wherein said second surface area is a glazed depression in the surface of the paper member.

7. A paper member as claimed in claim 6, wherein the film optical element is disposed below the outer plane of said surface of the paper member.

8. A paper member as claimed in claim 1 or 2, wherein the second surface area is a compressed surface section of the paper member.

9. A paper member as claimed in claim 1 or 2, wherein the second surface area is surrounded by the first surface area.

10. A paper member as claimed in claim 1 or 2, wherein the second surface area is a stripe extending across a portion of the first surface area.

11. A paper member as claimed in claim 1, wherein the optical film element is a transfer from another substrate.

12. A paper member as claimed in claim 1, wherein the film optical element is a liquid crystal polymer.

* * * * *